Jan. 16, 1962     S. D. MOXLEY, JR     3,017,107
QUARTER-SQUARE MULTIPLIER AND CORRELATOR
Filed April 5, 1956     3 Sheets-Sheet 1

INVENTOR.
STEVE D. MOXLEY, JR.
BY *Jerry J. Dunlap*
ATTORNEY

INVENTOR.
STEVE D. MOXLEY, JR.
BY Jerry J. Dunlap
ATTORNEY

3,017,107
QUARTER-SQUARE MULTIPLIER AND CORRELATOR

Steve D. Moxley, Jr., Ponca City, Okla., assignor to Continental Oil Company, Ponca City, Okla., a corporation of Delaware
Filed Apr. 5, 1956, Ser. No. 576,494
3 Claims. (Cl. 235—194)

This invention relates to a new method and apparatus for the production of electrical signals representing specific functions of the magnitude of other electrical signals.

One object of the invention is to provide a novel and simplified method of and means for multiplying two signals and obtaining a resultant signal which represents the continuous result of the multiplication.

Another object of this invention is to provide an improved and novel analogue computing circuit by means of which the product of two electrical signals may be obtained.

A further object of this invention is to provide an improved and novel analogue computing circuit by means of which the product of two varying electrical signals may be obtained and integrated over a period of time.

An additional object of this invention is to provide novel circuits of the types described which are simpler and less expensive to build and maintain than prior similar apparatus.

Other objects of the invention will become apparent from the following specifications.

Briefly stated, the invention contemplates a new method of continuously multiplying together two input signals to yield an indication of their instantaneous product, which comprises separately but continuously adding and subtracting the input signals to provide respective intermediate signals both symmetrical about a reference voltage level, respectively rectifying the components of said signals with reference to said voltage level, and raising them each to a power greater than unity, combining the resulting signals together to provide a second reference voltage, and regulating the voltage difference between said reference voltages to yield the desired product as a function of the magnitude of regulation required to equalize said reference voltage levels.

In practicing the invention, use is made of the well known quarter-square multiplying technique. This method relies upon the mathematical relation $$x \cdot y = \frac{(x+y)^2 - (x-y)^2}{4} = \frac{(x+y)^2}{4} - \frac{(x-y)^2}{4}$$

As seen from the equation, the technique, when used to obtain an electrical voltage proportional to the product of two monitored electrical voltages, requires the following operations:

(1) The sum and difference of the two voltages must first be obtained.

(2) The sum voltage and the difference voltages must be individually squared, and (3) The difference between the squared sum voltage and the squared difference voltage must be derived.

Since, in most of the applications of this technique, it is required to derive an output signal which is only proportional to the product of the two input signals, the three preceding steps are sufficient.

The invention will be better understood from the following description taken in connection with the accompanying drawings, in which.

Figure 1:
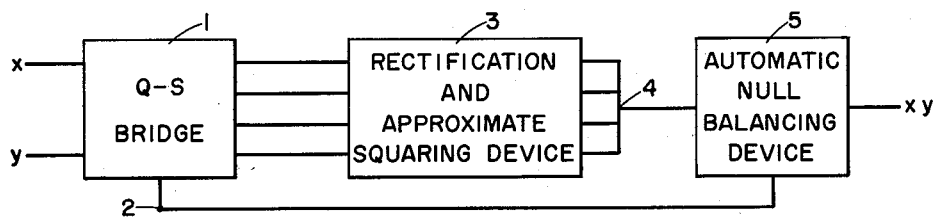
FIG. 1 is a block diagram illustrating the basic steps involved in practicing the invention.

The successive steps comprising the invention are best understood by reference to FIG. 1. Two electrical signals, mathematically represented by two time functions $x(t)$ and $y(t)$, are fed to a quarter-square bridge 1. This type of bridge, commonly used in the quarter-square multiplying technique, will be described in detail below. At this point, it suffices to say that the bridge provides at the midpoints of its legs voltages equal to half of the sum and half of the difference of the voltages applied at its diagonally opposed corners, and these voltages are referred to the center common point 2 of the bridge.

The voltages appearing at the midpoints of the legs of the bridge 1 are applied to a set 3 of matched and alternately poled rectifiers having approximately square law characteristics, whereby the sum and difference voltages are simultaneously rectified and approximately squared. A pair of rectifiers are provided for each of the sum and difference voltages, and the currents supplied by all of the rectifiers are combined at a second common point 4, thereby allowing full wave rectification of said voltages—resulting in a voltage at point 4 having a constant polarity corresponding to the constant positive sign required by the mathematical squaring operation. Furthermore, the two pairs of matched rectifiers are connected in opposite directions so that the combined current flowing into the second common point 4 is proportional to the difference between the square of the sum and the square of the difference voltages. This resulting current is therefore an indication of the product $x \cdot y$. If the second common point 4 is dynamically maintained at the reference voltage level of the first common point 2 by means of a null balancing device 5 with automatic output adjustment means, the output of the null balancing device 5 is an indication of the magnitude of the instantaneous product $x \cdot y$.

Figure 2:
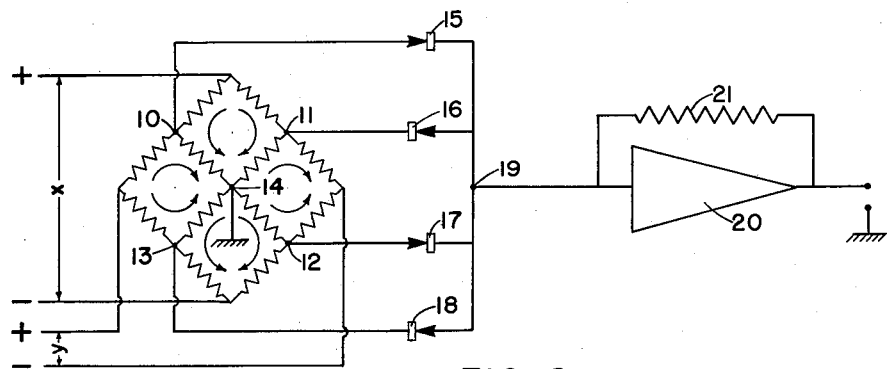
FIG. 2 is a diagram illustrating a multiplier circuit embodying the invention.

Referring now to FIG. 2, there is shown a particular embodiment of the invention in which the null balancing device is an analogue amplifier. Ground centered voltages $x$ and $y$ are applied to a balanced resistance bridge comprising twelve matched resistors forming the above-mentioned quarter-square bridge. The twelve resistors are connected in such symmetry as to form four legs, with two resistors in series in each leg. The four remaining resistors join the midpoints 10, 11, 12, and 13 of each of the legs to a common center point 14.

If the voltages $x$ and $y$ are applied to opposite corners of the resistance bridge, there appears at points 10 and 12 and at points 11 and 13 respectively, center-grounded voltages proportional respectively to the sum and the difference of the two voltages $x$ and $y$, with the sum and difference voltages having the same proportionality constant. The resistance bridge is made up of twelve resistances of equal value, that is, as exactly matched as practically feasible.

The center-grounded sum and difference voltages appearing at points 10 and 12 and points 11 and 13 respectively are applied to a set of matched rectifiers 15, 16, 17, and 18 arranged to perform the full wave rectification of these sum and difference voltages. Furthermore, these matched rectifiers are selected for having approximate square law characteristics. In other words, the voltages are applied to a common point 19 through the forward and backward resistances of matched diodes or rectifiers. The forward current of each rectifier is approximately proportional to the square of the applied voltage in the range of operation used, and the back resistance of each rectifier is infinite, that is, extremely large in comparison to the forward resistance. By matched rectifiers or diodes, it is meant that all four rectifiers must have similar forward characteristics and similar backward characteristics; that is, for any given applied voltage in the operating range, an equal current should flow through any of the rectifiers of the set.

The total current resulting from the combination of the currents flowing through the four rectifiers, which is indicative of the product $x \cdot y$, is applied to the input of a high gain analogue amplifier 20. The amplifier 20 has a feedback resistance 21 set for the desired gain or magnitude of the output signal, that is, depending on the desired value of the coefficient of the product $x \cdot y$.

A high gain analogue amplifier with negative feedback is characterized by its ability to hold its input voltage close to some fixed voltage in the operating range of the amplifier input. In the circuit just described, this potential level must be the same as the potential level used as reference for the input voltages and to which the center point 14 of the balanced bridge is tied. This is a necessary condition to have an operating circuit. In this example, the reference voltage has been taken as ground potential, but the circuit will work if this voltage has any arbitrary value.

The analogue amplifier with negative feedback holds (at all times) its output voltage to a value sufficient to drain off the current flowing into or out of the analogue amplifier input through the four diodes, thus maintaining the amplifier input grid essentially at ground potential.

Referring back to the equation previously given, it is seen that, if the analogue amplifier 20 maintains an output voltage sufficient to draw through its feedback resistance 21 the sum of the currents supplied at the common point 19 by the rectifiers (thus maintaining the analogue amplifier input voltage at ground potential), the voltage developed across the feedback resistor 21, and consequently the output voltage of the analogue amplifier 20, is proportional to the product of the two input voltages $x$ and $y$. The magnitude of this output voltage may be adjusted by the size of the resistor 21.

The circuit which has just been described constitutes a simple and inexpensive circuit which performs very satisfactorily the desired multiplication. A quarter-square bridge of twelve resistors provides the sum and difference voltages required for the quarter-square multiplying technique. A minimum of four diodes in the circuit perform the functions of squaring the sum and difference signals; they also provide the phase inversion (which must be done if the squaring is done by non-rectifying, nonlinear elements in another electrical circuit), and by their common junction they perform the subtraction between the two squared voltages necessary in the quarter-square method of multiplication.

Figure 3:
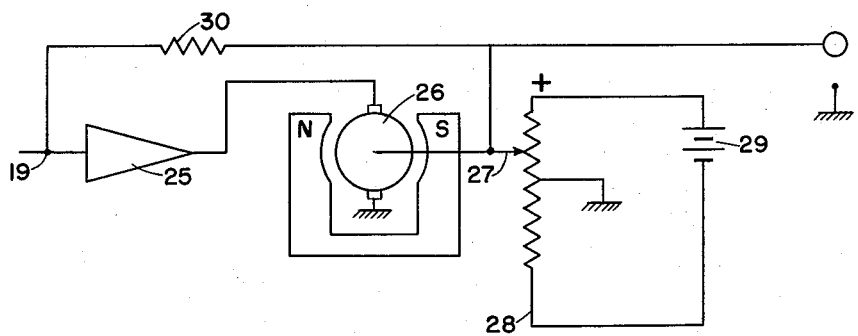
FIG. 3 is a diagram illustrating a portion of another multiplier circuit embodying the invention.

Referring now to FIG. 3, there is shown another type of null-balancing device which may be used for some applications of this invention, particularly when very low frequency variations are concerned. The second common point 19, where the sum of the currents going through the four matched rectifiers has to be maintained at the same voltage level as the first common point of the quarter-square bridge, is again shown. For simplification, bridge and rectifying elements (which would be the same as those of FIG. 2) have not been shown on FIG. 3.

An amplifier 25 is used to derive from the voltage variations appearing at 19 a variable current appropriate to energize a D.C. motor 26. The motor 26 may be of the permanent magnet type, as shown, or have independent constant current excitation means (not shown).

The rotation of motor 26 controls the third arm 27 of a center tapped potentiometer 28. This potentiometer is connected to a fixed voltage source, for example a battery 29. The motor 26 maintains the third arm 27 of potentiometer 28 at the proper position to create a balancing current through the resistor 30 (the equivalent of the feedback resistor 21 of FIG. 2), thereby balancing out the voltage variations applied to the point 19. The potential of arm 27 is therefore indicative of the product $x \cdot y$ and is used as the output of the circuit, again with reference to the center point of the quarter-square bridge which is connected to the center tap of the potentiometer. In our example, this reference potential is taken to be the ground potential.

Figure 4:
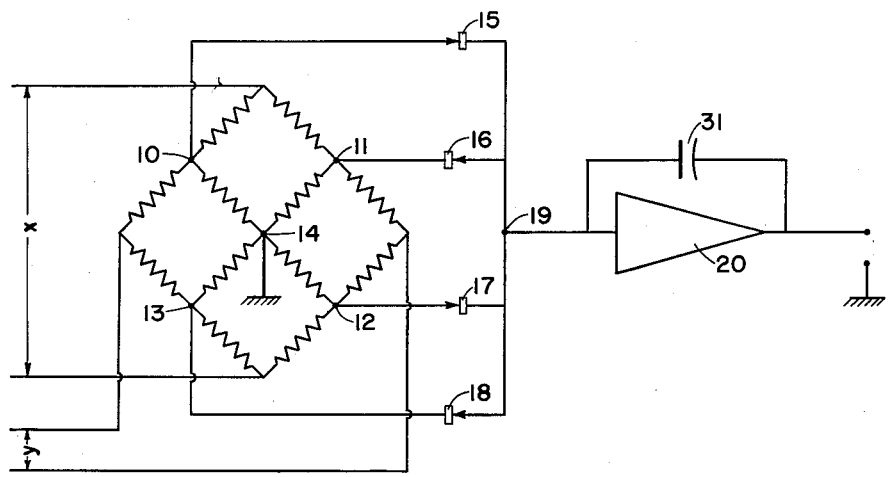
FIG. 4 is a diagram illustrating a correlator circuit embodying the invention.

In FIG. 4 there is shown the same quarter-square bridge of twelve equal resistors, and the same four matched diodes circuit having the previously mentioned second common point 19. The point 19 in this instance is connected to the input of an analogue feedback amplifier 20 whose feedback element is a capacitor 31. The analogue computing circuit obtained in this manner is a multiplier integrator. Its operation is based on the fact that the output voltage of the amplifier 20 required to hold the input voltage of the amplifier at a fixed potential, instead of being proportional to the current it draws out of the common point 19, must now be proportional to the time integral of that current. This results from the presence of the capacitor 31 and from the relation between voltage and current across a capacitance.

Thus the output voltage of the analogue amplifier 20 of FIG. 4 is related to the input voltages $x$ and $y$ of the quartersquare bridge by the relation:

$$k\int x(t)y(t)dt$$

The circuit described produces an output signal whose magnitude is proportional to the average value of the instantaneous product of its two input signals over a desired time interval. The use of multiplier integrator circuits for determining the degree of similarity between electrical signals is well known. This multiplication and integration operation is commonly called the correlation of the two signals and the circuit performing this operation is called a correlator.

I have found that the circuit of FIG. 4 may be used as a practical correlator even in the case where the diodes used do not have true square law current-versus-voltage characteristics. Experimental graphical analysis has shown that any diode whose current-versus-voltage characteristic in the forward conducting direction ascends according to any power greater than 1, and particularly those for which the current increases as any power between 1.5 and 4 of the voltage, may be used in the circuits of FIG. 2 and FIG. 4. Such diodes will give a result similar to multiplication when used in connection with the circuit of FIG. 2, and usable correlation when used in connection with the circuit of FIG. 4.

Figure 5:
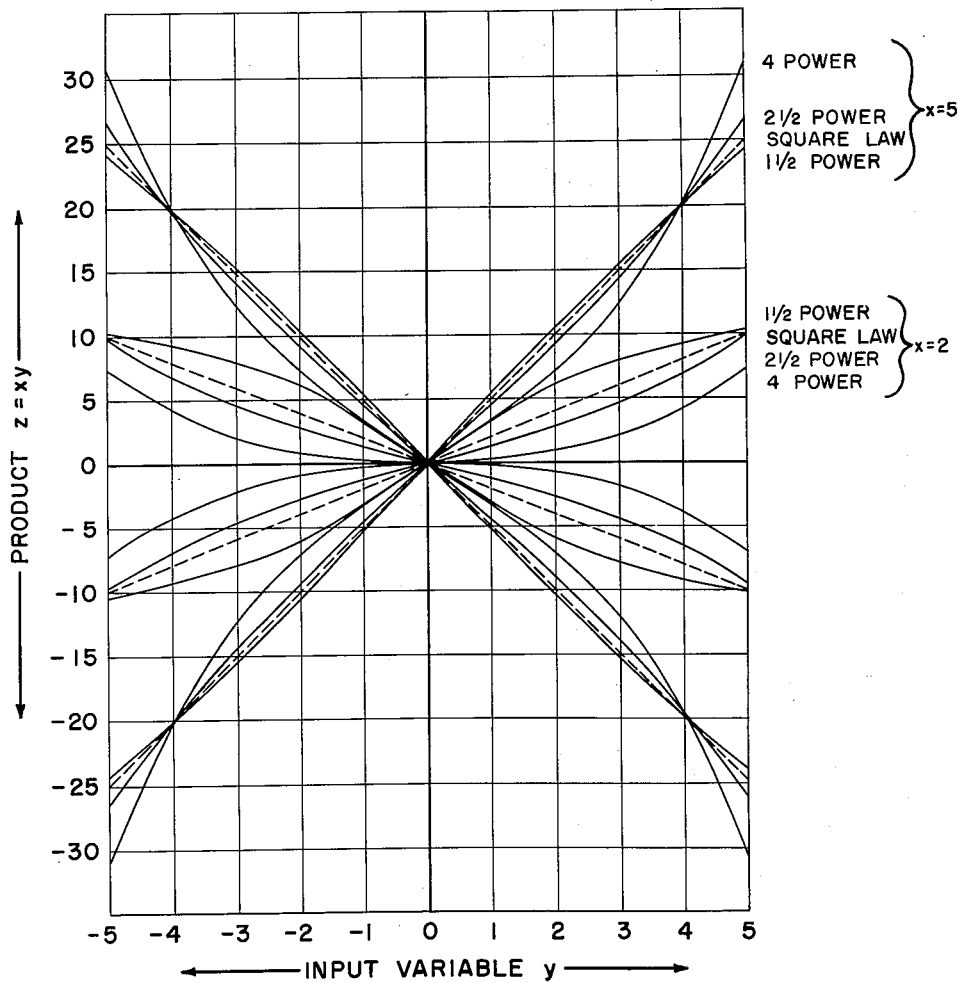
FIG. 5 illustrates the effect of using rectifiers with various nonlinear characteristics rather than square law in quarter-square multiplication.

FIG. 5 shows the effect of the nonlinear characteristic of diodes which have been actually used. The values of the product $z=x.y$ indicated by the multiplier are plotted as functions of $y$ for the two discrete values of $x$, two and five. Exact products are on the straight lines $z=2y$ and $z=5y$. It is observed that when the diodes have characteristics corresponding to a power equal to any value between 1.5 and 4, the circuit will give a very good approximation of the average value of the products of the two signals within the range of interest.

A preferred embodiment of my invention utilizes a set of crystal rectifiers, since then no heater supply is required, and the circuit is not sensitive to fluctuations in this supply. The high-inverse-voltage crystal rectifiers are preferred because of their stability in the current voltage characteristic under operating conditions.

It has been discovered also that diodes which have appreciable reverse current, that is, which have a finite conductivity when a potential difference is applied in the reverse direction, can also be used if their forward and reverse current characteristics are matched and if, at any absolute voltage within the range of interest, their reverse current is equal to the difference between their actual forward current for said voltage and the current which would correspond to an exact square law current-versus-voltage relationship.

Figure 6:
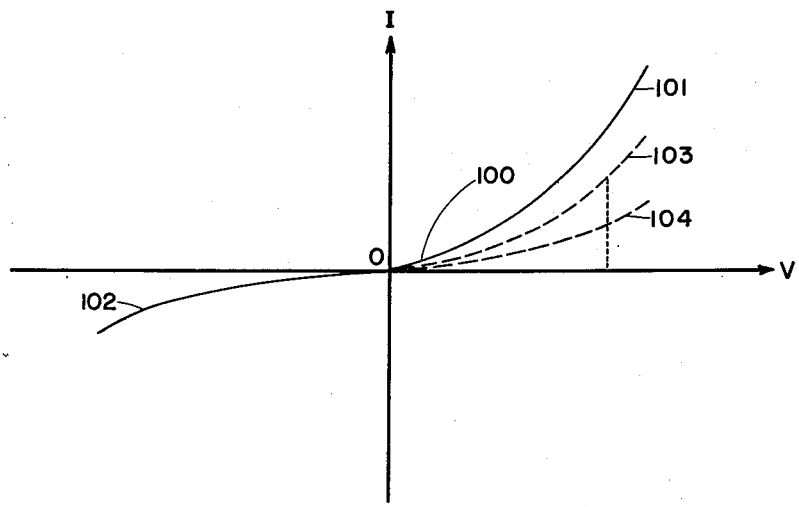
FIG. 6 illustrates the characteristics of other nonlinear devices which can be used as rectifiers in circuits embodying the invention.

This is further explained by reference to FIG. 6, wherein the space current characteristic of a diode is indicated by a curve 100 extending on both sides of the ordinate axis as portions 101 and 102, thereby showing that the diode has a finite resistivity in both directions. Curve 103 represents the difference between the absolute values of the currents corresponding to the same absolute voltage. Curve 103 is obtained by tracing a curve 104 symmetrical with respect to the origin of coordinates of the portion 102 of curve 100, and then reading and plotting the difference between the ordinates of curves 101 and 104 as the new curve 103. If the curve 103 corresponding to a set of matched diodes used in the circuits hereinabove described indicates an approximate square law relationship, the circuits will perform the desired operations.

This may be explained as follows: the sum and difference voltages are center-grounded at the first common point in the bridge, therefore, at any instant, a positive voltage and an equal negative voltage are applied respectively to the same pole of two matched diodes whose other poles are connected to a second common point. This second common point is dynamically held at zero potential by action of the feedback amplifier circuit. However, no current flows into the amplifier itself. When an alternating voltage is applied, the current flowing through the diode corresponding to the positive side of the center-grounded alternating voltage is given by the forward portion of the diode characteristic. At the same time another current flowing through the other diode as a result of the negative potential applied at its poles is given by the reverse portion of the same diode characteristic. Therefore, the current which has to flow through the feedback element of the analogue amplifier is equal to the difference between these two currents. If this difference is substantially proportional to the square of the voltage, the output of the analogue amplifier is proportional to the product of the input voltages as desired.

It must be noticed that the voltage level of the junction of the four diodes, hereinabove referred to as the second common point and which must be dynamically held at the same voltage level as the common point of the quarter-square bridge, must be, in this case, the voltage level at which portions 101 and 102 of the characteristic curve 100 separate. In general for a rectifier, this will be zero voltage, therefore the common point of the quarter-square bridge should be at zero potential which may be taken as reference ground potential.

From the foregoing it will be apparent that the present invention provides a novel method of and analogue computing circuit for obtaiinng the product of two electrical signals. The output of the circuit represents the continuous result of the multiplication. Also, the products may be integrated if desired. It will further be apparent that the present circuit is simple in construction and may be economically manufactured.

Changes may be made in the combination and arrangement of elements or steps as heretofore set forth in the specification and shown in the drawings, it being understood that changes may be made in the precise embodiments shown without departing from the spirit and scope of the invention as defined in the appended claims.

Having thus described my invention, I claim:

1. Apparatus for producing a continuous output signal whose magnitude is proportional to the instantaneous product of two input signals, comprising an impedance bridge having four legs connected in series, respective sets of input terminals connected across opposite diagonals of said bridge, impedance elements connecting the midpoints of the respective legs of said bridge to a first common point, alternately poled matched nonlinear rectifiers connecting successive midpoints of said legs to a second common point and connected in an unbiased manner, an output circuit connected between said second common point and said first common point, and means in said output circuit for maintaining said first and second common points at the same reference voltage level characterized further in that each of said rectifiers has a characteristic curve which includes one portion in which the space current deviates appreciably from values equal to the square of the voltage applied in one direction across said rectifier, and another portion in which the space current for voltages applied in other direction is substantially equal to the magnitude of the deviation, for equal values of the voltages applied in the opposite directions, and in which said reference voltage level is the voltage separating said portions of said curve.

2. Apparatus for producing a continuous output signal whose magnitude is proportional to the instantaneous product of two input signals, comprising: an impedance bridge having four legs connected in series, respective sets of input terminals connected across opposite diagonals of said bridge, impedance elements connecting the midpoints of the respective legs of said bridge to a first common point, alternately poled matched nonlinear rectifiers connecting successive midpoints of said legs to a second common point and connected in an unbiased manner, an output circuit connected between said second common point and said first common point, and means in said output circuit for maintaining said first and second common points at the same reference voltage level characterized further in that the characteristic impedance of the rectifiers operating in the forward direction and the characteristic impedance of the remaining rectifiers operating in the reverse direction when combined will form a substantially square law characteristic impedance, all of said rectifiers being biased at ground potential.

3. A device as described in claim 2 and further characterized in that said output circuit comprises an analog feedback amplifier whose feedback element is a capacitor.

References Cited in the file of this patent

UNITED STATES PATENTS 2,401,404     Bedford _____ June 4, 1946

OTHER REFERENCES

Catalog and Manual on GAP/R (Philbrick), December 1951, pages 6 and 18.

Electronic Analog Computers (Korn & Korn), 1952, pages 11 and 235.

Introduction to Electronic Analog Computers (Wass), 1955, page 143.